(12) United States Patent
Asano (10) Patent No.: US 9,197,869 B2
(45) Date of Patent: Nov. 24, 2015

(54) VIDEO DISPLAY DEVICE AND COOLING SYSTEM

(71) Applicant: Sony Corporation, Tokyo (JP)

(72) Inventor: Yoshiro Asano, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 163 days.

(21) Appl. No.: 13/920,233

(22) Filed: Jun. 18, 2013

(65) Prior Publication Data

US 2013/0342765 A1  Dec. 26, 2013

(30) Foreign Application Priority Data

Jun. 25, 2012  (JP) .................................. 2012-141643

(51) Int. Cl.
| | |
|---|---|
| *G03B 21/16* | (2006.01) |
| *H04N 9/31* | (2006.01) |
| *F28F 1/00* | (2006.01) |
| *G06F 1/20* | (2006.01) |
| *H01J 61/02* | (2006.01) |
| *H01J 61/52* | (2006.01) |

(52) U.S. Cl.
CPC ................ *H04N 9/3144* (2013.01); *F28F 1/00* (2013.01); *G03B 21/16* (2013.01); *G06F 1/206* (2013.01); *H04N 9/3105* (2013.01); *H01J 61/025* (2013.01); *H01J 61/52* (2013.01)

(58) Field of Classification Search
CPC .......... G03B 21/16; H01J 61/25; H01J 61/52; H01J 61/86
USPC ........ 353/52, 54, 57, 98; 165/104.31, 104.33, 165/121, 185; 349/5, 7–9
See application file for complete search history.

(56) References Cited

U.S. PATENT DOCUMENTS

| | | | |
|---|---|---|---|
| 5,170,195 A * | 12/1992 | Akiyama et al. ................ 353/54 |
| 2005/0056401 A1* | 3/2005 | Saito et al. .................... 165/80.3 |
| 2006/0209266 A1* | 9/2006 | Utsunomiya ................... 353/54 |
| 2007/0068653 A1* | 3/2007 | Kondou et al. ............... 165/80.4 |
| 2008/0024733 A1* | 1/2008 | Gerets et al. ..................... 353/52 |
| 2009/0237619 A1* | 9/2009 | Yanagisawa et al. ........... 353/54 |
| 2010/0045940 A1* | 2/2010 | Takagi ............................ 353/54 |
| 2010/0118279 A1* | 5/2010 | Itsuki et al. ..................... 353/54 |
| 2011/0155353 A1* | 6/2011 | Wan et al. ................ 165/104.31 |

* cited by examiner

*Primary Examiner* — Sultan Chowdhury
(74) *Attorney, Agent, or Firm* — Frommer Lawrence & Haug LLP; William S. Frommer (57) ABSTRACT

A video display device includes: a video processing unit including a light source and optical components, which generates and displaying video signals; and a cooling mechanism unit cooling the light source and the optical components, wherein the cooling mechanism unit includes an air cooling fan generating cooling air for cooling the optical components to be circulated in the device, a heat exchanger arranged in a flow path of the circulating cooling air, performing heat exchange of the cooling air obtained after the cooling of the optical components from a high temperature to a low temperature, a cooler cooling heat generated in the light source and heat generated in the heat exchanger by a cooling liquid, and a circulating thermal regulator circulating the cooling liquid with respect to the cooler while managing a liquid temperature of the cooling liquid so as to be a constant temperature.

7 Claims, 7 Drawing Sheets

VIDEO DISPLAY DEVICE AND COOLING SYSTEM

FIELD

The present disclosure relates to a video display device performing video display and a cooling system performing cooling.

BACKGROUND

A projector device is a device for displaying videos by irradiating a liquid crystal panel with light from a light source and projecting light transmitted through the liquid crystal panel on a screen by a projection lens.

In such a projector device, various optical components will be a high temperature due to heat of the light source. Accordingly, cooling is performed, for example, by taking outside air into a device casing by using an air cooling fan.

In the method of taking outside air into the casing by using the air cooling fan to perform cooling, dust is also taken at the same time as taking outside air and the dust may adhere to various optical components.

When the dust is taken in, the dust blocks transmitting light of the liquid crystal panel or makes the light reflect diffusely which causes stains or blots on an image. Accordingly, a dustproof filter is provided on an intake side of the air cooling fan to remove dust.

A cooling device receiving heat from a cooling medium flowing through a duct by a radiator part including a heat-receiving plate and a thermoelement is proposed as a related-art technology.

An example of the related-art technology is disclosed in JP-A-2006-343498.

SUMMARY

As described above, air from which dust is removed by the filter is generally used as the air for cooling the optical components of the projector device.

However, as it is difficult to completely remove extremely small dust such as vaporized oil and cigarette smoke, dust remaining after the removal by the filter adheres to optical components.

Accordingly, it is necessary to periodically clean the optical components, and periodic replacement/cleaning of the filter is also necessary as the filter is gradually clogged.

Furthermore, the force of taking air by the air cooling fan becomes weak and the cooling force is reduced as the filter is clogged. Then, the temperature of optical components increases, therefore, it becomes difficult to maintain stable cooling. Additionally, as the cooling by the air cooling fan which takes outside air is affected by an outside air temperature, it is difficult to maintain stable cooling also due to this reason.

As described above, in the related-art cooling method using the cooling fan which takes outside air and the dustproof filter, there are problems that man hours of maintenance/inspection are increased and thus it is further difficult to maintain stable cooling.

Meanwhile, there is a method in which a water cooled jacket is arranged in the vicinity of components to be cooled and a fixed-temperature water is circulated by using a thermo-chiller as a cooling method different from the cooling method using the cooling fan which takes outside air and the dust-proof filter.

However, as the light source has a particularly high heating value, a water cooled jacket for the light source is provided separately from the water cooled jacket for cooling prisms in related art. Accordingly, the number of water cooled jackets and the number of ducts are increased, which may increase the number of components necessary for cooling.

In view of the above, it is desirable to provide a video display device and a cooling system capable of reducing the man hours of maintenance/inspection and the number of components necessary for cooling to thereby perform stable cooling.

An embodiment of the present disclosure provides a video display device. The video display device includes a video processing unit including a light source and optical components, which generates and displaying video signals, and a cooling mechanism unit cooling the light source and the optical components. The cooling mechanism unit includes an air cooling fan, a heat exchanger, a cooler and a circulating thermal regulator. The air cooling fan generates cooling air for cooling the optical components to be circulated in the device. The heat exchanger is arranged in a flow path of the circulating cooling air and performs heat exchange of the cooling air obtained after the cooling of the optical components from a high temperature to a low temperature. The cooler cools heat generated in the light source and heat generated in the heat exchanger by a cooling liquid. The circulating thermal regulator circulates the cooling liquid with respect to the cooler while managing a liquid temperature of the cooling liquid so as to be a constant temperature.

According to the embodiment of the present disclosure, it is possible to reduce the man hours of maintenance/inspection and the number of components necessary for cooling to thereby perform stable cooling.

DETAILED DESCRIPTION

Figure 1:
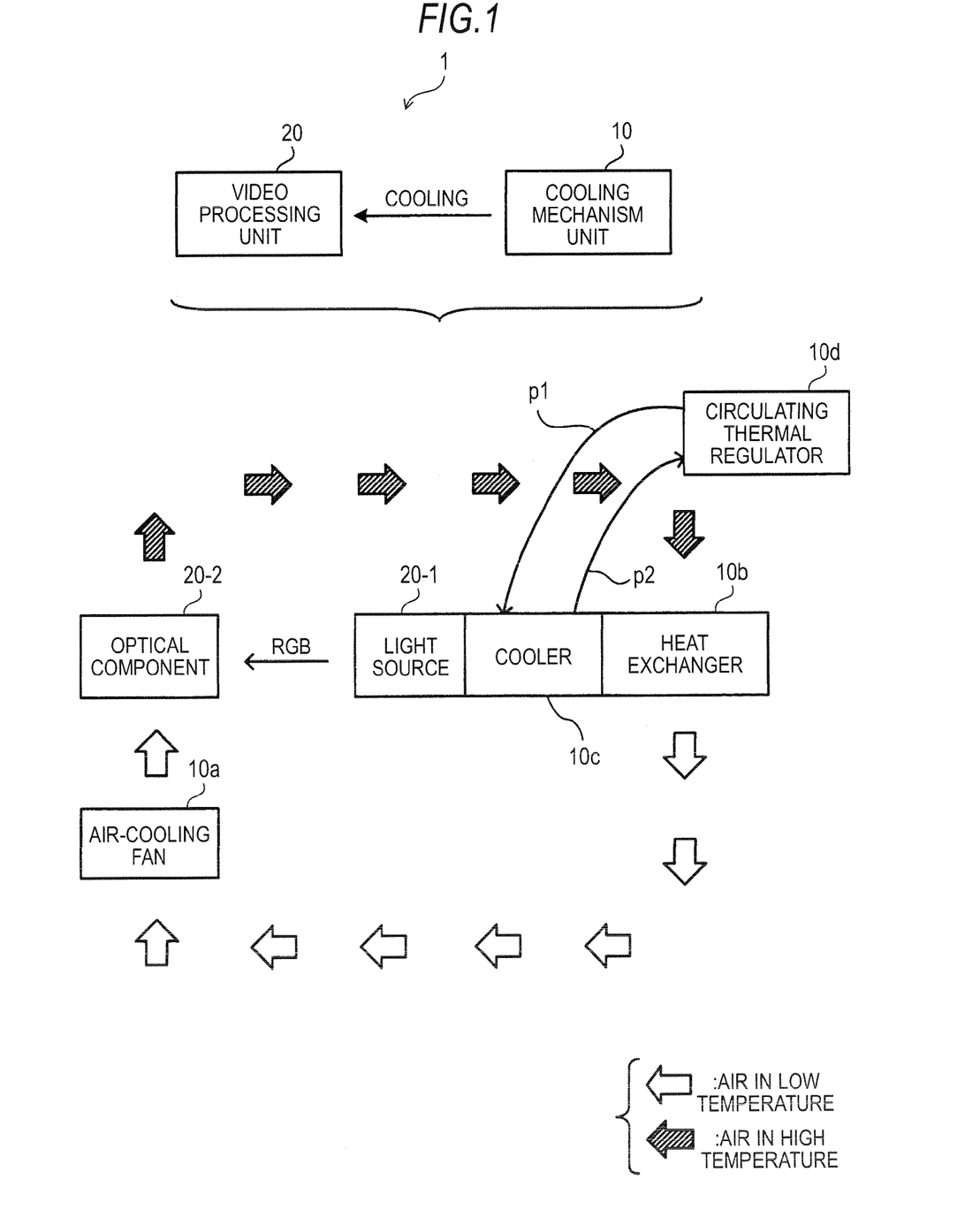
FIG. 1 is a diagram showing a structure example of a video display device.

Hereinafter, an embodiment of the present disclosure will be explained with reference to the drawings. FIG. 1 is a diagram showing a structure example of a video display device. A video display device 1 is provided with a video display unit 20 including a light source (laser light source) 20-1 and an optical component 20-2, which generates and displays video signals and a cooling mechanism unit 10 cooling the light source 20-1 and the optical component 20-2. The video display device 1 corresponds to, for example, a projector device.

The cooling mechanism unit 10 includes an air cooling fan 10a, a heat exchanger 10b, a cooler 10c and a circulating thermal regulator 10d. The air fan 10a takes air at a lower temperature obtained after the heat exchange is performed in the device and generates cooling air for cooling the optical component 20-2 to be circulated in the device.

The heat exchanger 10b is arranged in a flow path of circulating cooling air, performing heat exchange of cooling air obtained after the cooling of the optical components 20-2 from a high temperature to a low temperature. The cooler 10c cools heat generated in the light source 20-1 and heat generated in the heat exchanger 10b by a cooling liquid.

The circulating thermal regulator 10d circulates the cooling liquid with respect to the cooler 10c while managing a liquid temperature of the cooling liquid so as to be a fixed temperature. The cooling liquid is transmitted to the cooler 10c through a duct p1 and is returned to the circulating thermal regulator 10d through a duct p2.

As described above, the cooling air for cooling the optical component 20-2 is circulated by the air cooling fan 10a and the heat exchanger 10b is arranged in the flow path of the circulating cooling air in the video display device 1. Then, the cooler 10c connected to the circulating thermal regulator 10d cools both the light source 20-1 and the heat exchanger 10b.

That is, the cooler 10c directly cools the light source 20-1 (a second cooling target component) having a higher temperature than the optical component 20-2 (a first cooling target component) in the video display device 1. Additionally, the optical component 20-2 is cooled by cooling air generated by the air cooling fan 10a, and air in a high temperature obtained after the cooling is applied to the heat exchanger 10b to be exchanged into air in a low temperature, then, the low temperature air is taken by the air cooling fan 10a. The heat generated in the heat exchanger 10b after the application of the high temperature air is also cooled by the same one cooler 10c which cools the light source 20-1.

According to the above structure, as it is not necessary to provide the cooler for cooling prisms and the cooler for cooling the light source as in related art, the number of components and the number of ducts can be reduced, which can drastically reduce the number of components necessary for cooling.

Additionally, as the outside air is not used for cooling, maintenance to be performed when using the air cooling fan which takes outside air and the dustproof filter as in related art is not necessary, which can drastically reduce the man hours of maintenance/inspection. It is also possible to maintain stable cooling not affected by variation of the outside air temperature.

Figure 2:
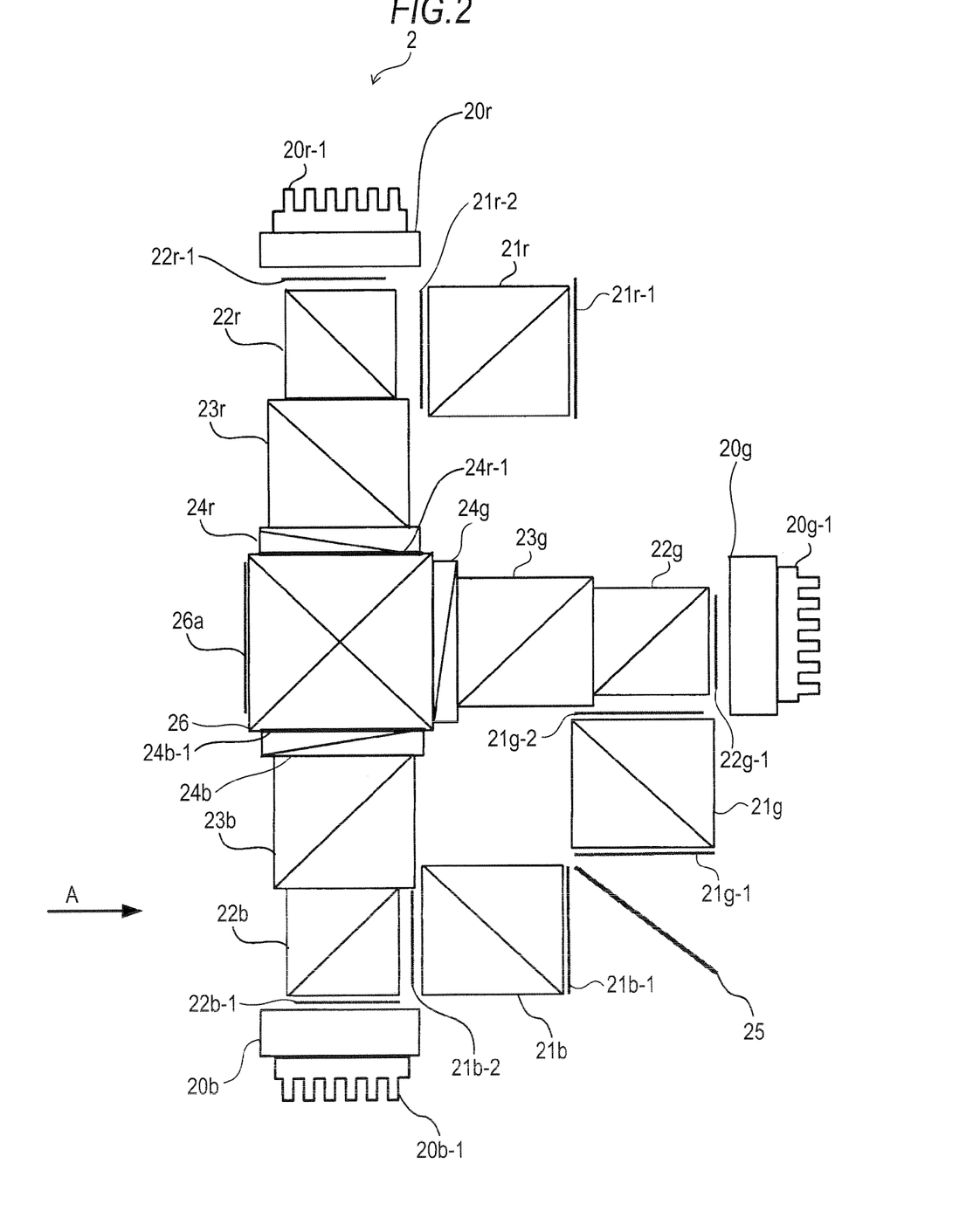
FIG. 2 is a diagram showing a structure example of an optical block.

Next, a structure of an optical block inside the optical component 20-2 will be explained. FIG. 2 is a diagram showing a structure example of the optical block. A LCOS (Liquid Crystal On Silicon) type optical block 2 is shown, which has a T-shaped prism structure.

The optical block 2 includes a red (F) reflective LCD (Liquid Crystal Display) 20r, a green (G) reflective LCD 20g and a blue (B) reflective LCD 20b as reflective liquid crystal panels.

Various prisms which are a pre-PBS (Polarization Beam Splitter) 21r, a main PBS 22r, a post PBS 23r and a buffer prism 24r are arranged around the red reflective LCD 20r.

A trimming filter 21r-1 is provided on an incident surface of the pre-PBS 21r and a ½ wavelength plate 21r-2 is provided on an emission surface of the pre-PBS 21r. Furthermore, a ¼ wavelength plate 22r-1 is provided between the main PBS 22r and the red reflective LCD 20r.

Various prisms which are a pre-PBS 21g, a main PBS 22g and a post PBS 23g and a buffer prism 24g are arranged around the green reflective LCD 20g.

A trimming filter 21g-1 is provided on an incident surface of the pre-PBS 21g and a ½ wavelength plate 21g-2 is provided on an emission surface of the pre-PBS 21g. Furthermore, a ¼ wavelength plate 22g-1 is provided between the main PBS 22g and the green reflective LCD 20g.

Various prisms which are a pre-PBS 21b, a main PBS 22b and a post PBS 23b and a buffer prism 24b are arranged around the blue reflective LCD 20b.

A trimming filter 21b-1 is provided on an incident surface of the pre-PBS 21b and a ½ wavelength plate 21b-2 is provided on an emission surface of the pre-PBS 21b. Furthermore, a ¼ wavelength plate 22b-1 is provided between the main PBS 22b and the blue reflective LCD 20b.

Furthermore, a dichroic mirror 25 which separates light into green light and blue light, and a 4p prism 26 which combines red light, green light and blue light after polarization conversion and emits the combined. A ½ wavelength plate 24r-1 is provided between the 4p prism 26 and the buffer prism 24r.

Moreover, a ½ wavelength plate 24b-1 is provided between the 4p prism 26 and the buffer prism 24b. A ¼ wavelength plate 26a is provided on an emission surface of the 4p prism 26.

Furthermore, heat sinks 20r-1, 20g-1 and 20b-1 are provided on the red reflective LCD 20r, the green reflective LCD 20g and the blue reflective LCD 20b.

One flat surface of the heat sink 20r-1 is bonded to the red reflective LCD 20r and comb-shaped fins for releasing heat are provided on the other surface. Similarly, one flat surface of the heat sink 20g-1 is bonded to the green reflective LCD 20g and comb-shaped fins are provided on the other surface. One flat surface of the heat sink 20b-1 is bonded to the blue reflective LCD 20b and comb-shaped fins are provided on the other surface. A material of the heat sinks 20r-1, 20g-1 and 20b-1 is, for example, copper or aluminum.

Figure 3:
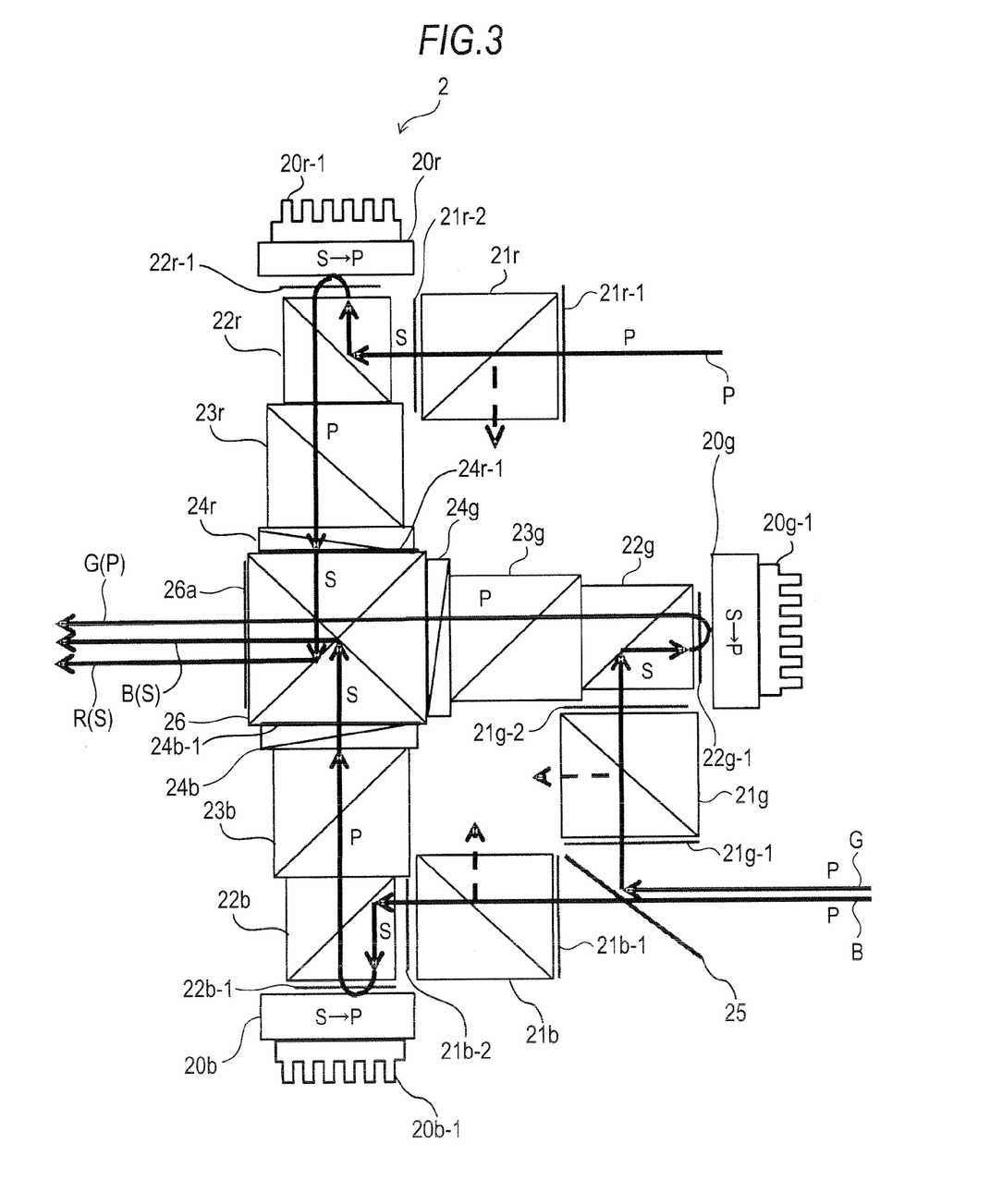
FIG. 3 is a view showing the operation of the optical block.

Next, the operation of the optical block 2 will be explained. FIG. 3 is a view showing the operation of the optical block. In the optical block 2, polarization is aligned by performing conversion from a P-wave to an S-wave or from an S-wave to a P-wave for increasing contrast.

Concerning an optical path of red light (R), first, red light is incident on the pre-PBS 21r. At this time, the trimming filter 21r-1 provided on the incident surface of the pre-PBS 21r eliminates light of unnecessary wavelength components from the incident red light.

The pre-PBS 21r reflects light other than P-wave light (a dotted-line arrow in the drawing) and transmits only P-wave red light in red light after transmitted through the trimming filter 21r-1. The ½ wavelength plate 21r-2 provided on the emission surface of the pre-PBS 21r converts P-wave red light emitted from the pre-PBS 21r into S-wave red light to be incident on the main PBS 22r.

The main PBS 22r reflects S-wave red light toward the red reflective LCD 20r. The red reflective LCD 20r reflects S-wave red light after converting the light into P-wave red light.

At this time, the ¼ wavelength plate 22r-1 provided between the main PBS 22r and the red reflective LCD 20r transmits S-wave red light reflected on the main PBS 22r and makes the light incident on the red reflective LCD 20r. The ¼ wavelength plate 22r-1 transmits red light spatially modulated and converted into the P-wave in the red reflective LCD 20r and makes the light incident on the main PBS 22r again.

The P-wave red light generated in the red reflective LCD 20r is transmitted through the main PBS 22r, the post PBS 23r and the buffer prism 24r. Then, the ½ wavelength plate 24r-1 provided between the 4p prism 26 and the buffer prism 24r converts the P-wave red light emitted from the buffer prism 24r into the S-wave and makes the light incident on the 4p prism 26.

The S-wave red light incident on the 4p prism 26 is reflected on the 4p prism 26, transmitted through the ¼ wavelength plate 26a and emitted toward a not-shown projection lens (R(S) in the drawing).

Concerning an optical path of green light (G), first, when green and blue mixed light is incident on the dichroic mirror 25, green light is reflected and blue light is transmitted, thereby separating the light into green light and blue light.

The reflected green light is incident on the pre-PBS 21g. At this time, the trimming filter 21g-1 provided on the incident surface of the pre-PBS 21g eliminates light of unnecessary wavelength components from the incident green light.

The pre-PBS 21g reflects light other than P-wave light (a dotted-line arrow in the drawing) and transmits only P-wave green light in green light after transmitted through the trimming filter 21g-1. The ½ wavelength plate 21g-2 provided on the emission surface of the pre-PBS 21g converts P-wave green light emitted from the pre-PBS 21g into S-wave green light to be incident on the main PBS 22g.

The main PBS 22g reflects S-wave green light toward the green reflective LCD 20g. The green reflective LCD 20g reflects S-wave green light after converting the light into P-wave green light.

At this time, the ¼ wavelength plate 22g-1 provided between the main PBS 22g and the green reflective LCD 20g transmits S-wave green light reflected on the main PBS 22g and makes the light incident on the green reflective LCD 20g. The ¼ wavelength plate 22g-1 transmits green light spatially modulated and converted into the P-wave in the green reflective LCD 20g and makes the light incident on the main PBS 22g again.

The P-wave green light generated in the green reflective LCD 20g is transmitted through the main PBS 22g, the post PBS 23g and the buffer prism 24g. Then, the P-wave green light emitted from the buffer prism 24g is incident on the 4p prism 26.

The P-wave green light incident on the 4p prism 26 is transmitted through the 4p prism 26 and the ¼ wavelength plate 26a and emitted toward a not-shown projection lens (G(P) in the drawing).

Concerning an optical path of blue light (B), first, when green and blue mixed light is incident on the dichroic mirror 25, green light is reflected and blue light is transmitted, thereby separating the light into green light and blue light.

The reflected blue light is incident on the pre-PBS 21b. At this time, the trimming filter 21b-1 provided on the incident surface of the pre-PBS 21b eliminates light of unnecessary wavelength components from the incident blue light.

The pre-PBS 21b reflects light other than P-wave light (a dotted-line arrow in the drawing) and transmits only P-wave blue light in blue light after transmitted through the trimming filter 21b-1. The ½ wavelength plate 21b-2 provided on the emission surface of the pre-PBS 21b converts P-wave blue light emitted from the pre-PBS 21b into S-wave blue light to be incident on the main PBS 22b.

The main PBS 22b reflects S-wave blue light toward the blue reflective LCD 20b. The blue reflective LCD 20b reflects S-wave blue light after converting the light into P-wave blue light.

At this time, the ¼ wavelength plate 22b-1 provided between the main PBS 22b and the blue reflective LCD 20b transmits S-wave blue light reflected on the main PBS 22b and makes the light incident on the blue reflective LCD 20b. The ¼ wavelength plate 22b-1 transmits blue light spatially modulated and converted into the P-wave in the blue reflective LCD 20b and makes the light incident on the main PBS 22b again.

The P-wave blue light generated in the blue reflective LCD 20b is transmitted through the main PBS 22b, the post PBS 23b and the buffer prism 24b. Then, the ½ wavelength plate 24b-1 provided between the 4p prism 26 and the buffer prism 24b converts the P-wave blue light emitted from the buffer prism 24b into the S-wave and makes the light incident on the 4p prism 26.

The S-wave blue light incident on the 4p prism 26 is reflected on the 4p prism 26, transmitted through the ¼ wavelength plate 26a and emitted toward a not-shown projection lens (B(S) in the drawing).

Figure 4:
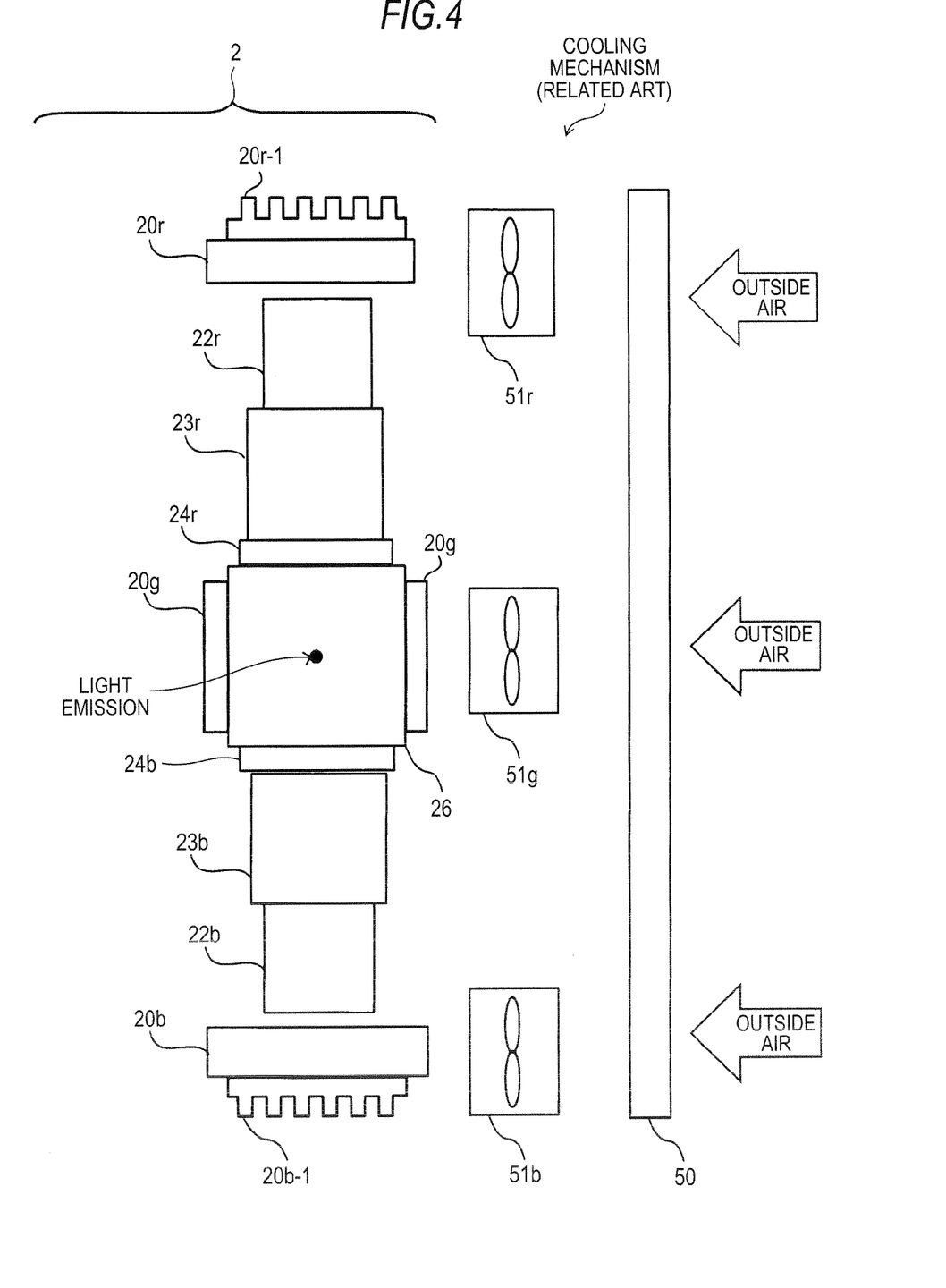
FIG. 4 is a view showing a cooling mechanism of the optical block.

Next, a related-art cooling mechanism with respect to the optical block 2 will be explained. FIG. 4 is a view showing a cooling mechanism of the optical block. The related-art cooling mechanism using air cooling fans 51r, 51g and 51b and a dustproof filter 50 in the projector device is shown.

FIG. 4 is the view seen from an A direction of FIG. 2, in which the air cooling fans 51r, 51g and 51b and the dustproof filter 50 are arranged in the vicinity of the optical filter 2 (Accordingly, emission light from the 4p prism 26 is emitted in the upper direction on the paper).

The air cooling fan 51r is arranged close to the red reflective LCD 20r, the air cooling fan 51g is arranged close to the green reflective LCD 20g and the air cooling fan 51b is arranged close to the blue reflective LCD 20b. The dust proof filter 50 is arranged on an intake side of respective air cooling fans 51r, 51g and 51b.

In the related-art cooling mechanism, cooling air generated from the air cooling fans 51r, 51g and 51b by using outside air after removing dust by the dustproof filter 50 is applied to given components (the heat sinks and so on) to perform cooling.

However, the above cooling mechanism has the following problems.

Periodic replacement/cleaning of the dustproof filter 50 will be necessary.

Extremely small dust such as vaporized oil and cigarette smoke is difficult to be removed even when the dustproof filter 50 is used. Automation such as an automatic cleaning system or a filter winding system will not be a fundamental solution for removing the small dust.

Periodical cleaning of optical components will be necessary as luminance is reduced when the dust not being removed by the dustproof filter 50 adheres to optical paths of respective optical components.

As the dustproof filter 50 is gradually clogged, the temperature of optical components is also increased, it is difficult to maintain stable cooling and the optical performance is reduced. Additionally, as the cooling by the air cooling fan is affected by the outside air temperature, it is difficult to maintain stable cooling.

As it is difficult to take countermeasures for noise in the air cooling filters 51r, 51g and 51b arranged in the vicinity of the dustproof filter 50 as they have the structure of generating cooling air by taking outside air, fan noise is conspicuous.

Meanwhile, there is a method in which a water cooled jacket is arranged in the vicinity of components to be cooled and a fixed-temperature water is circulated by using a thermochiller as a cooling method different from the cooling method described above.

However, the water cooled jacket for cooling prisms and the water cooled jacket for the light source are provided in related art, therefore, there is a problem that the number of water cooled jackets and the number of ducts are increased.

In view of the above, it is desirable to provide a video display device and a cooling system capable of reducing the man hours of maintenance/inspection and the number of components necessary for cooling to thereby perform stable cooling.

Figure 5:
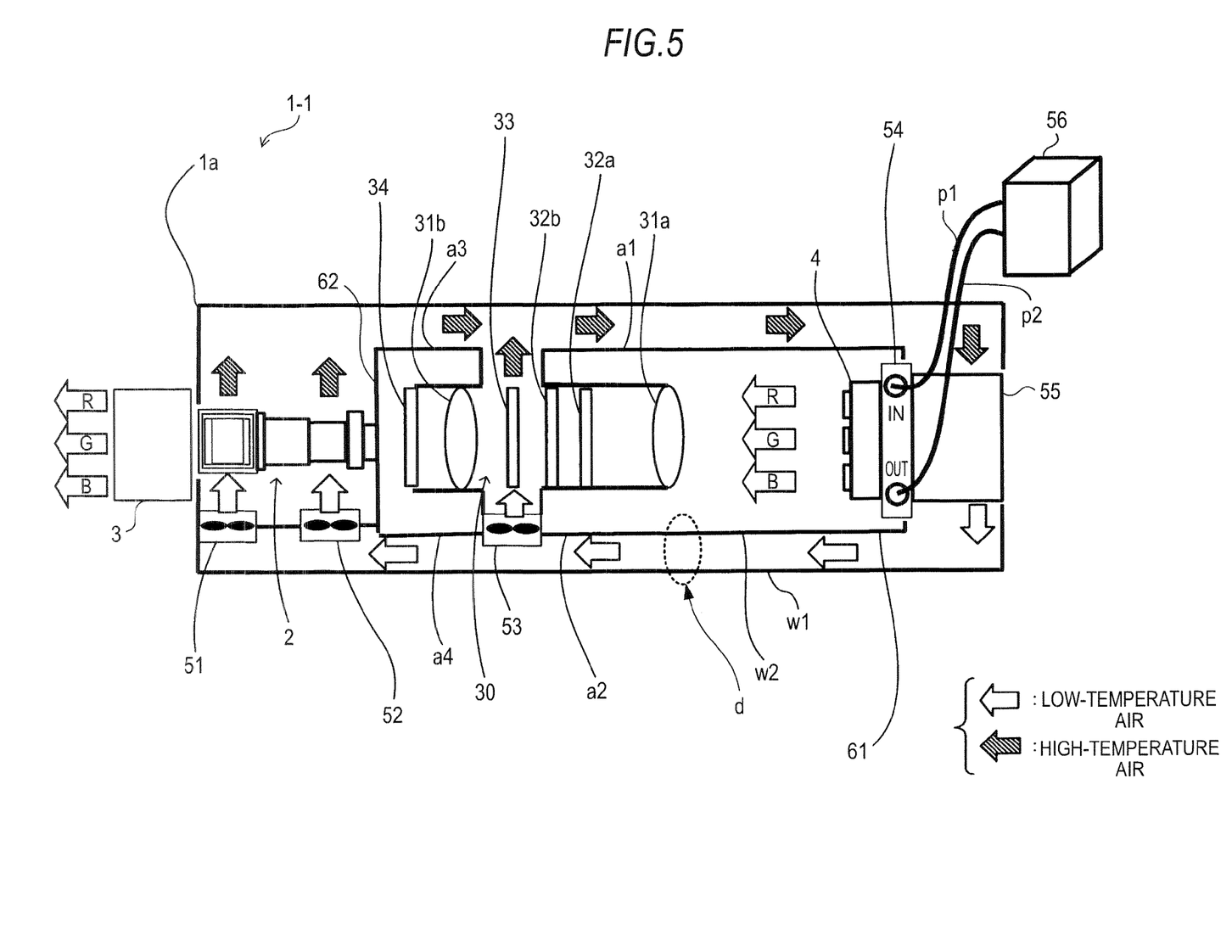
FIG. 5 is a view showing the cooling mechanism.

Next, the cooling mechanism of the video display device 1 according to the embodiment of the present disclosure will be explained. FIG. 5 is a view showing the cooling mechanism. A circulating cooling mechanism in the device (cooling system) is shown. FIG. 5 is a view showing the optical block 2 of FIG. 2 seen from a direction of the red reflective LCD 20r.

A video display device 1-1 is provided with a projection lens 3, a video generation unit 1a and a thermo-chiller (circulating thermal regulator) 56. The video generation unit 1a includes the optical block 2, an illumination unit 30, a light source 4, air cooling fans 51 to 53, a water cooled jacket (cooler) 54, a heat exchanger 55 and supporting portions 61 and 62.

Respective optical components in the illumination unit 30 and the light source 4 are covered with the supporting portions 61 and 62 in the video generation unit 1a. The supporting portion 61 has arms a1 and a2.

The light source 4 and the water cooled jacket 54 touching the light source 4 are arranged inside the supporting portion 61 on a bottom where the arms a1 and a2 are not provided. A collimator lens 31a and fly-eye lenses 32a and 32b are arranged between the arms a1 and a2 of the supporting portion 61 so that the collimator lens 31a and the fly-eye lenses 32a and 32b are supported by the arms a1 and a2.

The supporting portion 62 has arms a3 and a4 which are arranged so as to face the arms a1 and a2 of the supporting portion 61. A collimator lens 31b and a dichroic mirror 34 are arranged between the arms a3 and a4 so that the collimator lens 31b and the dichroic mirror 34 are supported by the arms a3 and a4.

On face of the water cooled jacket 54 directly touch the light source 4 and the other opposite face directly touches the heat exchanger 55 (for example, a heat sink or a radiator structure). The water cooled jacket 54 has an input section IN and an output section OUT of a circulating liquid (for example, water), which is connected to the thermo-chiller 56 through the ducts p1 and p2.

The operation of the optical system will be explained. First, red light (R), green light (G) and blue light (B) emitted from the light source 4 is incident on the collimator lens 31a. The collimator lenses 31a and 31b make red light, green light and blue light be parallel light by combination of two pieces of lenses.

The fly-eye lenses 32a and 32b make red light, green light and blue light be uniform by combination of two pieces of lenses. A PS converter 33 converts an S-wave to a P-wave.

The dichroic mirror 34 performs color separation of red light, green light and blue light for allowing red light, green light and blue light to be incident on given positions of the optical block 2 in the subsequent stage respectively.

After that, light emitted from the illumination unit 30 is incident on the optical block 2, and red light, green light and blue light emitted from the optical block 2 are incident on the projection lens 3. The projection lens 3 projects a video on a not-shown screen. As the operation of the optical block 2 has been described above, the explanation is omitted.

Next, the structure and operation of the cooling mechanism will be explained. The video generation unit 1a including components to be cooled (the optical block 2 and the light source 4) is covered by a casing wall w1, having a sealing structure with respect to outside air. Additionally, a path made between the casing wall w1 and an outside wall w2 of the supporting portions 61 and 62 has a duct structure, and this duct "d" is a flow path of cooling air.

The air cooling fans 51 and 52 are provided near the optical block 2 and the air cooling fan 53 is provided near the illumination unit 30. Specifically, the air cooling fan 53 is arranged at a space between the arm a2 of the supporting portion 61 and the arm a4 of the supporting portion 62.

Here, as a cooling operation with respect to the light source 4, the circulating liquid transmitted from the thermo-chiller 56 enters the inside of the water cooled jacket 54 through the input section IN to thereby cool heat of the light source 4 directly touching the water cooled jacket 54. The circulating liquid used for cooling is transmitted to the thermo-chiller 56 through the output section OUT.

The thermo-chiller 56 circulates water as the cooling liquid while managing the liquid temperature to thereby maintain the temperature of cooling targets to be constant. The water for cooling is transmitted to the water cooled jacket 54 through the duct p1 and is returned to the thermo-chiller 56 through the duct p2. A circuit for circulating a cooling medium and water is included inside the thermo-chiller 56, and heat exchange is performed between the cooling medium and water through the circuit.

Concerning cooling operation of the optical components (the optical block 2 and the illumination unit 30), the air-cooling fans 51 and 52 generate the cooling air to thereby cool the optical block 2. The air cooling fan 53 generates cooling air to thereby cool the illumination unit 30.

The air in a high temperature obtained after the cooling of the optical block 2 flows through the duct "d" in the clockwise direction, being applied to and passes the heat exchanger 55 (the air is also applied to the water cooled jacket 54). The high-temperature air outputted from the space between the arm a1 of the supporting portion 61 and the arm a3 of the supporting portion 62 also flows through the duct "d" in the clockwise direction, being applied to and passes the heat exchanger 55.

The heat exchanger 55 directly touching the water cooled jacket 54 performs heat exchange which allows the air in the high temperature flowing through the duct "d" in the clockwise direction to be low in temperature, and the low-temperature air obtained after the heat exchange further flows in the duct "d" in the clockwise direction.

The air allowed to be low in temperature by the heat exchanger 55 is taken by intake ports of the air cooling fans 51 to 53 and is used for cooling the optical block 2 and the illumination unit 30 again, circulating in the video generation unit 1a to perform cooling after that.

According to the above structure, the video display device 1-1 has, for example, the following advantages.

"Maintenance free" can be realized due to the dustproof-filter less structure.

The number of components and the number of ducts in the water cooled jacket can be reduced by using the water cooled jacket for cooling the light source also as the heat exchanger for cooling the air.

As duct does not enter from the outside air due to the sealing structure, dust does not adhere to optical components.

As air is directly applied also to the water cooled jacket, condensation hardly occurs even in the vicinity of the dew-point temperature.

Fan noise of the air cooling fans is reduced due to the sealing structure.

As the temperature of optical components is fixed due to the sealing structure even when the outside air temperature varies, optical performance can be maintained.

Figure 6:
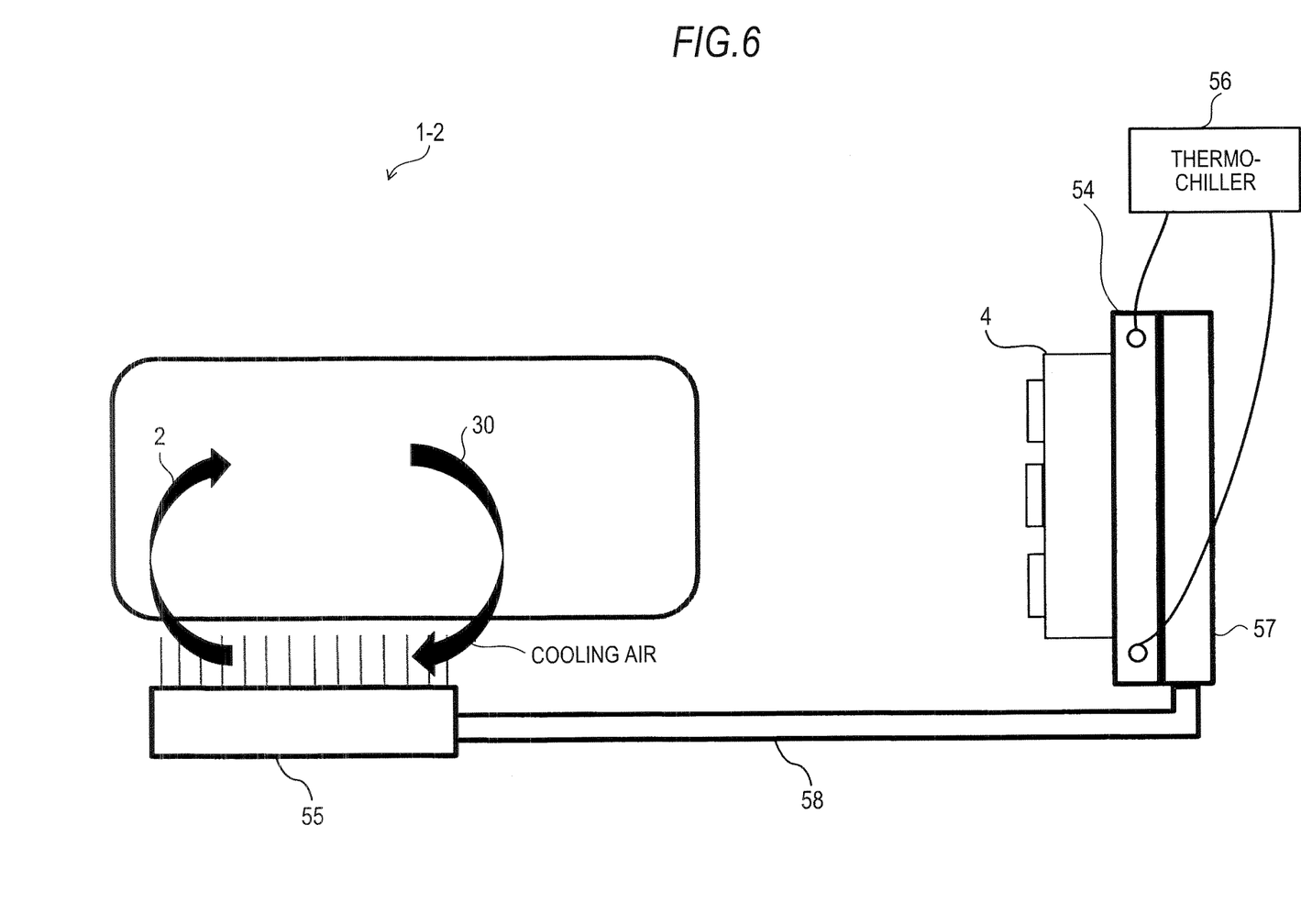
FIG. 6 is a view showing a modification example.
Figure 7:
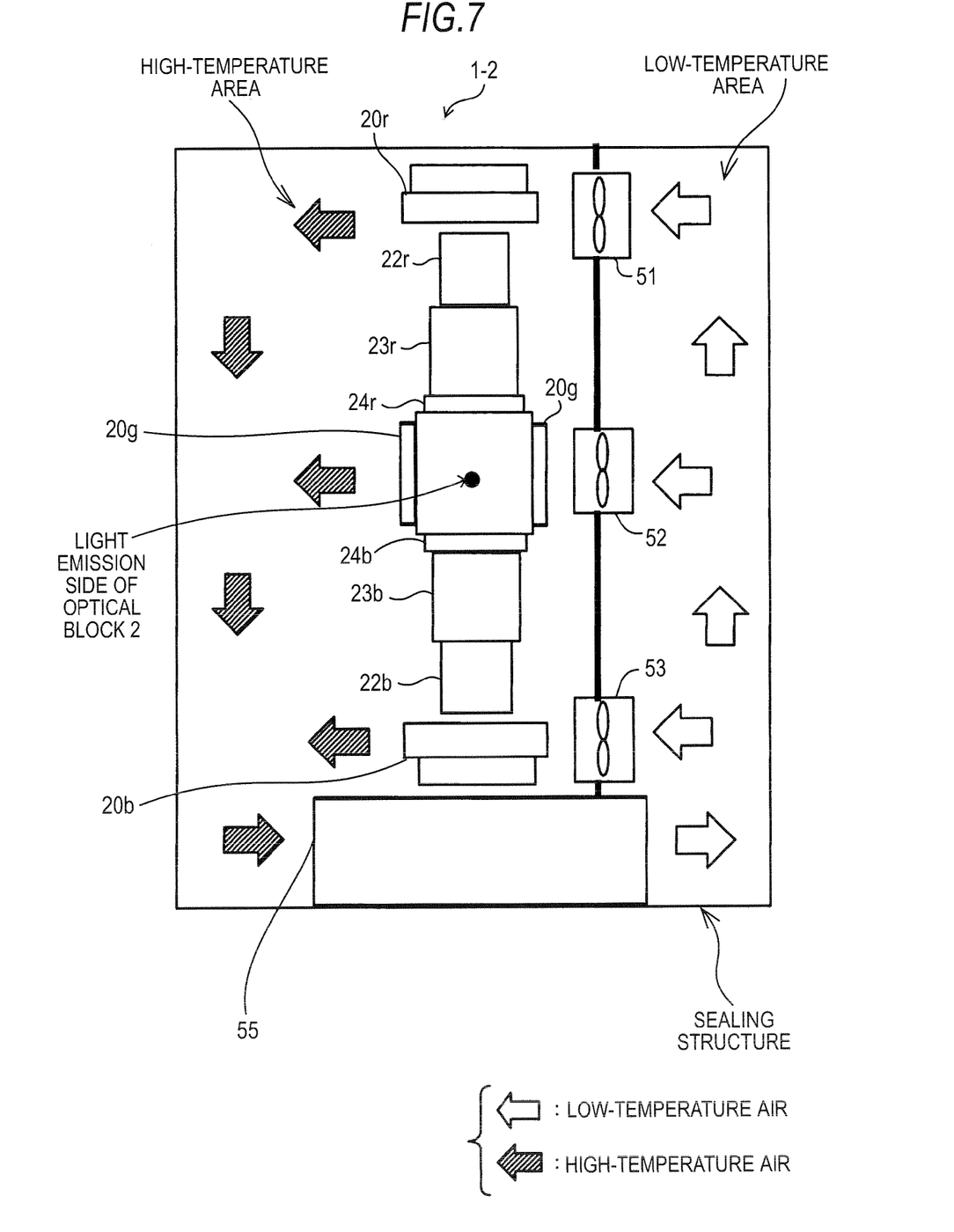
FIG. 7 is a view showing the modification example.

Next, a modification example of circulating cooling mechanism in the device (cooling system) of the video display device 1-1 will be explained. FIG. 6 and FIG. 7 are views showing the modification example. FIG. 6 is a conceptual diagram of the modification example of the video display device and FIG. 7 shows a cooling flow structure of heat exchange performed in the modification example of the video display device seen from the light emission side. The video display device 1-1 shown in FIG. 5 has the structure in which the heat exchanger 55 directly touches the water cooled jacket 54.

In contrast to the above, in a video display device 1-2 according to the modification example shown in FIG. 6 and FIG. 7, a heat-receiving plate 57 is allowed to touch the water cooled jacket 54 directly and the heat exchanger 55 is moved to a position close to the optical block 2 and the illumination unit 30. The heat-receiving plate 57 and the heat exchanger 55 are connected by a heat pipe 58.

As the heat-receiving plate 57, for example, a plate made of copper or aluminum is used as a material having high heat conductivity. The heat-receiving plate 57 and the heat exchanger 55 are connected through the heat pipe 58. The heat pipe 58 is made of a material having high heat conductivity, transporting heat received by the heat exchanger 55 to the heat-receiving plate 57. The heat transported to the heat-receiving plate 57 is cooled by the water cooled jacket 54.

Here, in the case where the distance from the optical block 2 and the illumination unit 30 to the light source 4 is long, it is considered that circulating air generated by the air cooling fans 51 to 53 becomes weak while passing through the path, which may increase the temperature.

Accordingly, to cope with such structure, the heat-receiving plate 57 is set so as to touch the opposite side of a surface for cooling the light source in the water cooled jacket 54, and the heat exchanger 55 is moved to the position close to the optical block 2 and the illumination unit 30 by using the heat pipe 58 as described above.

According to the above structure, it is possible to prevent the reduction of the cooling performance due to circulation in the device even when the distance from the optical block 2 and the illumination unit 30 to the light source 4 is long.

As described above, the dustproof filter can be omitted by the structure of the present technology, therefore, maintenance performed at the time of performing cooling by air is not necessary. Additionally, fan noise can be reduced as the air cooling fans are used in the sealing structure. Moreover, as the temperature of the circulating liquid is maintained to be constant even when the outside temperature varies, the temperature of optical components can be maintained to be constant all the time, which secures the optical performance.

Note that a projector set includes fans for cooling a power source, substrates and so on in addition to the fans for cooling optical components. However, as the fans for optical components are dominant with respect to fan noise in the entire set in many cases, the fan noise is drastically reduced when the air cooling fans for the optical components are sealed, which will greatly contribute to the noise reduction.

Furthermore, as the mechanism of taking outside air is not applied, the dustproof filter is not necessary as well as the optical components can be formed in a sealing structure. Accordingly, foreign particles such as small dust do not enter, and thus, adhesion of foreign particles to the optical components can be remarkably suppressed.

Furthermore, as one water cooled jacket performs both the cooling of the light source and the cooling of the heat exchanger to which the circulating air is applied, it is possible to drastically reduce the number of components necessary for cooling by reducing the number of water cooled jackets and the number of ducts, which can contribute to the reduction of the device scale as well as reduction of costs.

The present disclosure can apply the following configurations.

(1) A video display device including
a video processing unit including a light source and optical components, which generates and displaying video signals, and
a cooling mechanism unit cooling the light source and the optical components,
in which the cooling mechanism unit includes
an air cooling fan generating cooling air for cooling the optical components to be circulated in the device,
a heat exchanger arranged in a flow path of the circulating cooling air, performing heat exchange of the cooling air obtained after the cooling of the optical components from a high temperature to a low temperature,
a cooler cooling heat generated in the light source and heat generated in the heat exchanger by a cooling liquid, and
a circulating thermal regulator circulating the cooling liquid with respect to the cooler while managing a liquid temperature of the cooling liquid so as to be a constant temperature.

(2) The video display device described in the above (1),
in which a supporting portion supporting at least one of the light source or the optical components in the device is included, and
the cooling air is circulated inside a duct formed by an outer wall of the supporting portion and a casing wall of the device.

(3) The video display device described in the above (1) or (2),
in which the light source, the optical components, the air cooling fan, the heat exchanger and the cooler are formed in a sealing structure.

(4) A video display device including
a video processing unit including a light source and optical components, which generates and displaying video signals, and
a cooling mechanism unit cooling the light source and the optical components,
in which the cooling mechanism unit has
an air cooling fan generating cooling air for cooling the optical components to be circulated in the device,
a heat exchanger arranged in a flow path of the circulating cooling air, performing heat exchange of the cooling air obtained after the cooling of the optical components from a high temperature to a low temperature,
a heat conduction member transmitting heat generated in the heat exchanger,
a heat-receiving plate receiving the transmitted heat,
a cooler cooling heat generated in the light source and heat generated in the heat-receiving plate by a cooling liquid, and
a circulating thermal regulator circulating the cooling liquid with respect to the cooler while managing a liquid temperature of the cooling liquid so as to be a constant temperature.

(5) The video display device described in the above (4),
in which a supporting portion supporting at least one of the light source or the optical components in the device is included, and
the cooling air is circulated inside a duct formed by an outer wall of the supporting portion and a casing wall of the device.

(6) The video display device described in the above (4) or (5),
in which the light source, the optical components, the air cooling fan, the heat exchanger, the heat exchanger, the heat conduction member, the heat-receiving plate and the cooler are formed in a sealing structure.

(7) A cooling system including
an air cooling fan generating cooling air for cooling a first cooling target component to be circulated in the device,
a heat exchanger arranged in a flow path of the circulating cooling air, performing heat exchange of the cooling air obtained after the cooling of the first cooling target component from a high temperature to a low temperature,
a cooler cooling heat generated in a second cooling target component to be a higher temperature than the first cooling target component and heat generated in the heat exchanger by a cooling liquid, and
a circulating thermal regulator circulating the cooling liquid with respect to the cooler while managing a liquid temperature of the cooling liquid so as to be a constant temperature.

The above embodiment can be variously modified within a scope not departing from the gist of the present embodiment.

Furthermore, in the above embodiment, various alternations and modifications may occur to those skilled in the art. The embodiment is not limited to the above accurate structures and application examples.

The present disclosure contains subject matter related to that disclosed in Japanese Priority Patent Application JP 2012-141643 filed in the Japan Patent Office on Jun. 25, 2012, the entire contents of which are hereby incorporated by reference.

What is claimed is:

1. A video display device comprising:
a video processing unit including a light source, an illumination unit and an optical block; and
a cooling mechanism unit configured to cool the light source, the illumination unit and the optical block,
wherein the cooling mechanism unit includes
an air circulating system that does not use outside air for cooling, including at least one air cooling fan configured to circulate cooling air in the device for cooling the illumination unit and the optical block,
a heat exchanger arranged in a flow path of the circulating cooling air and configured to perform heat exchange of the cooling air obtained after the cooling of the illumination unit and the optical block so as to generate the cooling air circulated to the illumination unit and the optical block,
a cooler configured to use a cooling liquid for cooling heat generated in the light source and heat generated in the heat exchanger, and
a circulating thermal regulator configured to circulate the cooling liquid with respect to the cooler while managing a liquid temperature of the cooling liquid.

2. The video display device according to claim 1, further comprising:
a supporting portion supporting at least one of the light source, the illumination unit and the optical block, and
a duct formed by an outer wall of the supporting portion and a casing wall of the device through which the cooling air is circulated.

3. The video display device according to claim 1,
wherein the light source, the illumination unit, the optical block, the air cooling fan, the heat exchanger and the cooler are formed in a sealing structure.

4. A video display device comprising:
a video processing unit including a light source, an illumination unit and an optical block; and
a cooling mechanism unit configured to cool the light source, the illumination unit and the optical block,
wherein the cooling mechanism unit includes
an air circulating system that does not use outside air for cooling, including at least one air cooling fan configured to circulate cooling air in the device for cooling the illumination unit and the optical block,
a heat exchanger arranged in a flow path of the circulating cooling air and configured to perform heat exchange of the cooling air obtained after the cooling of the illumination unit and the optical block so as to generate the cooling air circulated to the illumination unit and the optical block,
a heat conduction pipe configured to transmit heat generated in the heat exchanger to a heat-receiving plate configured to receive the transmitted heat,
a cooler configured to use a cooling liquid for cooling heat generated in the light source and heat generated in the heat-receiving plate, and
a circulating thermal regulator configured to circulate the cooling liquid with respect to the cooler while managing a liquid temperature of the cooling liquid.

5. The video display device according to claim 4, further comprising:
a supporting portion supporting at least one of the light source, the illumination unit and the optical block, and
a duct formed by an outer wall of the supporting portion and a casing wall of the device through which the cooling air is circulated.

6. The video display device according to claim 4,
wherein the light source, the illumination unit, the optical block, the air cooling fan, the heat exchanger, the heat conduction pipe, the heat-receiving plate and the cooler are formed in a sealing structure.

7. A cooling system comprising:
an air circulating system that does not use outside air for cooling, including at least one air cooling fan configured to circulate cooling air in a device for cooling a first cooling target component in the device;
a heat exchanger arranged in a flow path of the circulating cooling air and configured to perform heat exchange of the cooling air obtained after the cooling of the first cooling target component so as to generate the cooling air circulated to the first cooling target component;
a cooler configured to use a cooling liquid for cooling heat generated in a second cooling target component at a higher temperature than the first cooling target component temperature and for cooling heat generated in the heat exchanger; and
a circulating thermal regulator configured to circulate the cooling liquid with respect to the cooler while managing a liquid temperature of the cooling liquid.

* * * * *